(12) United States Patent
Paas

(10) Patent No.: US 7,882,451 B2
(45) Date of Patent: Feb. 1, 2011

(54) SCREEN OBJECT PLACEMENT OPTIMIZED FOR BLIND SELECTION

(75) Inventor: Julian Paas, Mississauga (CA)

(73) Assignee: Research In Motion Limited, Waterloo, Ontario ( * ) Notice: Subject to any disclaimer, the term of this patent is extended or adjusted under 35 U.S.C. 154(b) by 1122 days.

(21) Appl. No.: 11/556,859

(22) Filed: Nov. 6, 2006

(65) Prior Publication Data

US 2008/0106516 A1     May 8, 2008

(51) Int. Cl.
*G06F 3/048* (2006.01)

(52) U.S. Cl. .................... 715/857; 715/764; 715/810; 715/811

(58) Field of Classification Search .............. 345/156, 345/157, 163, 164, 167; 379/419, 428.01, 379/433.01, 433.06; 455/403, 418; 715/764, 715/810, 811, 812, 813, 814, 815, 856, 857
See application file for complete search history.

(56) References Cited

U.S. PATENT DOCUMENTS

| | | | | |
|---|---|---|---|---|
| 5,598,183 | A * | 1/1997 | Robertson et al. | 715/856 |
| 5,825,353 | A * | 10/1998 | Will | 345/184 |
| 5,949,418 | A | 9/1999 | Shields et al. | |
| 6,005,549 | A | 12/1999 | Forest | |
| 6,201,534 | B1 * | 3/2001 | Steele et al. | 345/157 |
| 6,208,342 | B1 * | 3/2001 | Mugura et al. | 715/810 |
| 6,433,775 | B1 | 8/2002 | Gould et al. | |
| 6,487,396 | B1 * | 11/2002 | Sassi | 455/90.1 |
| 2004/0196256 | A1 | 10/2004 | Wobbrock et al. | |
| 2004/0263491 | A1 | 12/2004 | Ishigaki | |
| 2008/0080837 | A1 * | 4/2008 | Mei et al. | 386/95 |

FOREIGN PATENT DOCUMENTS

| | | |
|---|---|---|
| EP | 1 158 391 A2 | 11/2001 |
| WO | 02/23322 A1 | 3/2002 |

OTHER PUBLICATIONS

Jason Pascoe, Nick Ryan, and David Morse, "Using While Moving: HCI Issues in Fieldwork Environments", ACM Transactions on Computer-Human Interaction, vol. 7, No. 3, Sep. 2000, pp. 417-437.
Jacob O. Wobbrock and Brad A. Myers, "Trackball Text Entry for People with Motor Impairments", CHI 2006 Proceedings, Apr. 22-27, 2006, Montreal, Quebec, Canada.
European Office Action dated Mar. 9, 2010, issued on EP Patent Application No. 06123549.5; 4 pages.
User guide of the T610 from Sony Ericsson, 2003; http://www.sonyericsson.com/cws/download/1/872/56/1192969882/T610_UG_R5a_AE_Default.pdf; printed on Mar. 2, 2010; pp. 1-51.

* cited by examiner

*Primary Examiner*—My-Chau T Tran

(57) ABSTRACT

An improved handheld electronic device includes an input apparatus, an output apparatus, and a processor apparatus. The input apparatus includes a multi-axis input device such as a rollerball, trackball, joystick or touchpad, allowing the focus of a user interface program to be moved about a display from one screen object presented on that display to another. Up to four screen objects are presented on the display, each of those screen objects being positioned towards a corner of the display to enable a user to blindly operate the multi-axis input device, making use of a capture effect in which the focus of a user interface program is resisted from moving beyond an edge of the display, to guide movement of the focus to a given one of the up to four screen objects.

12 Claims, 3 Drawing Sheets

SCREEN OBJECT PLACEMENT OPTIMIZED FOR BLIND SELECTION

BACKGROUND OF THE DISCLOSED AND CLAIMED CONCEPT

1. Field of the Disclosed and Claimed Concept

The disclosed and claimed concept relates generally to handheld electronic devices and, more particularly, to a handheld electronic device with screen objects arranged on a display to optimize blind selection by a user of the electronic device.

2. Background of the Disclosed and Claimed Concept

Numerous types of handheld electronic devices are known. Examples of such handheld electronic devices include, for instance, personal data assistants (PDAs), handheld computers, two-way pagers, cellular telephones, and the like. Such handheld electronic devices are generally intended to be portable, and thus are relatively small. Many handheld electronic devices also features wireless communication capability, although many such handheld electronic devices are stand-alone devices that are functional without communication with other devices. With advances in technology, handheld electronic devices are being configured to include greater numbers of features while having relatively smaller form factors.

A user can interact or interface with a handheld electronic device in many fashions such as, for example, by actuating keys to provide inputs and by viewing outputs depicted on a display, as well as in numerous other fashions. It is desirable to configure a handheld electronic device to enable a user to provide inputs with minimal effort, because features that are complicated to use will simply be ignored by a user and left unused, thereby becoming of no value. Because of the generally competing considerations of reducing size of a handheld electronic device while increasing the complexity and versatility of the device, the various input devices on recent handheld electronic devices have often either been made relatively small or made to have multiple functions associated therewith, or both, and this can have the undesirable effect of complicating user inputs.

Efforts have been made to reduce the size of handheld electronic devices while maintaining or increasing their versatility by providing relatively fewer input members such as keys and by assigning multiple functions to at least some of the keys, including multiple linguistic elements such as letters, strokes, ideograms, and the like, as well as digits. Such a keyboard has been referred to as a reduced keyboard. Such handheld electronic devices will typically include a user interface having a routine that interprets the inputs from such input members. For instance, the user interface may provide for multitap input wherein a user actuates a key a number of times corresponding with the position of the desired linguistic element on a key. Another type of input routine is a disambiguation routine that performs a disambiguation function. That is, in response to an actuation of a key having multiple linguistic elements assigned thereto, the disambiguation routine outputs a linguistic element that is assumed to have been intended by the user based on various prediction models. Such a disambiguation routine typically will also output alternative linguistic elements or other types of alternative outputs intended to facilitate user input.

However, such efforts to reduce the physical size of the keyboard have resulted in keyboards that are less desirable than full-sized keyboards for use in navigating menus and selecting screen objects presented on displays, including objects corresponding to applications, functions within applications, or pieces of data to be used with applications. In answer to this, alternatives to keyboards and other groupings of keys have been provided on handheld electronic devices in the form of rollerballs, trackballs, joysticks and touchpads, just to name a few. However, the increasing quantity and complexity of applications available on handheld electronic devices can counteract the ease of use that these alternatives might otherwise offer, and the competing considerations of reducing the overall size of an electronic device while increasing functionality in a manner that doesn't overtax a user continues.

Adding to the issue of these competing considerations is the fact that as handheld electronic devices continue to be reduced further in size, it has started to become more commonplace for users of handheld devices to operate them in a manner in which the handheld device remains in pocket or holster, with the user seeking to operate the controls of those handheld devices with only one hand and without pulling them out and looking at them. In other words, users increasing seek to operate handheld devices by touch, alone, i.e., blindly, often by finding a control with their fingertips and remembering to operate a particular control in a particular way to achieve a particular function. A need exists to provide a user with the ability to select applications and/or pieces of data on a handheld electronic device in a manner that is amenable to both blind operation and the more conventional mode of sighted operation.

BRIEF DESCRIPTION OF THE DRAWINGS

A full understanding of the disclosed and claimed concept can be gained from the following Description of the Preferred Embodiments when read in conjunction with the accompanying drawings in which:

Similar numerals refer to similar parts throughout the specification.

DESCRIPTION OF THE PREFERRED EMBODIMENTS

Figure 1:
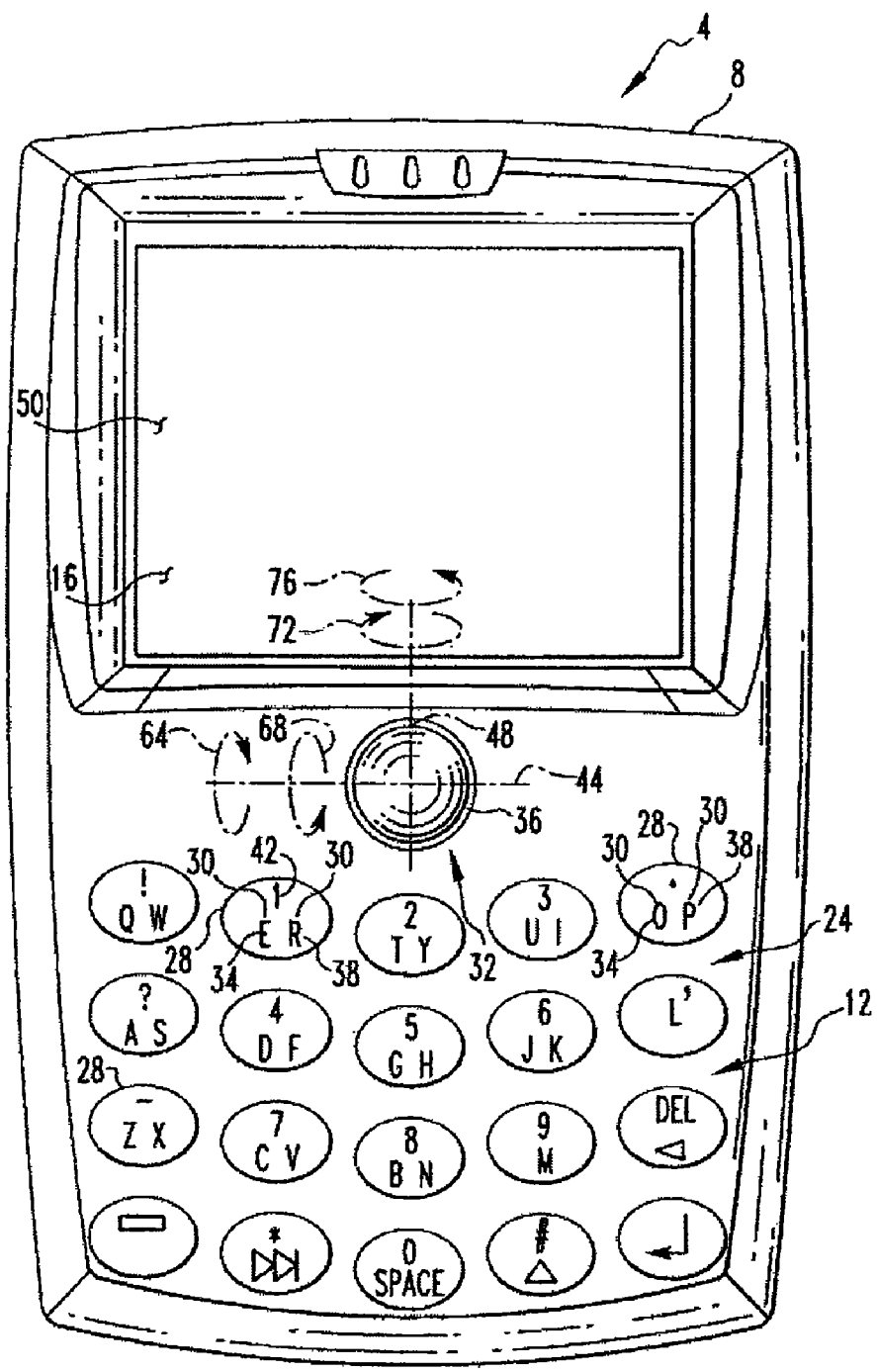
FIG. 1 is a top plan view of a handheld electronic device in accordance with a first embodiment of the disclosed and claimed concept.
Figure 2:
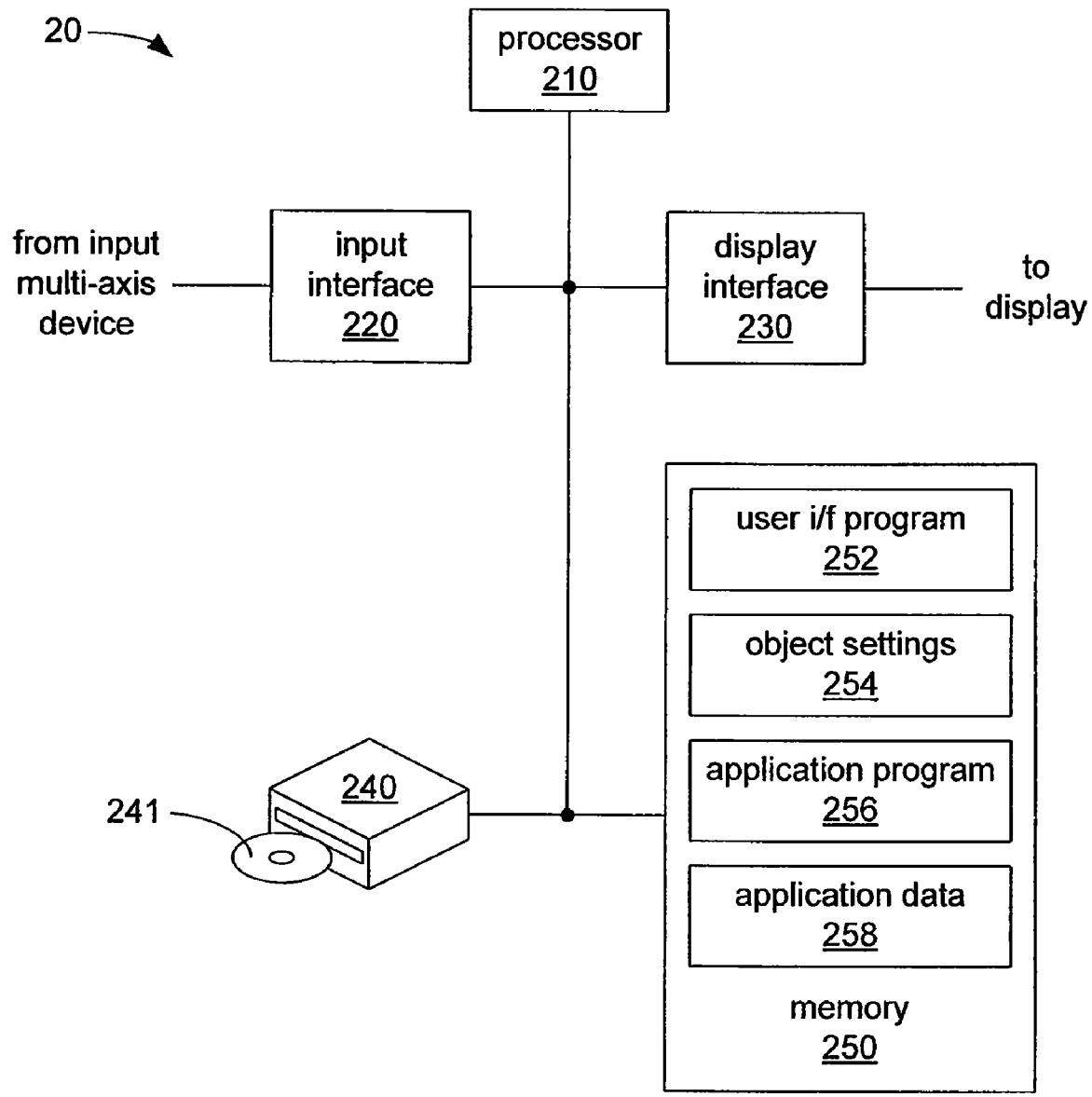
FIG. 2 is a schematic view of the handheld electronic device of FIG. 1.

An improved handheld electronic device 4 in accordance with the disclosed and claimed concept is indicated generally in FIG. 1 and is depicted schematically in FIG. 2. The exemplary handheld electronic device 4 includes a housing 8 upon which are disposed an input apparatus 12, an output apparatus 16 and a processor 210. The input apparatus 12 optionally includes a keypad 24 that may include a plurality of keys 28. The input apparatus 12 further includes a multi-axis input device, such as the rollerball 32 depicted in FIG. 1, that includes a movable portion 36.

In embodiments that optionally include the keypad 24, many of the keys 28 of the keypad 24 may each include a plurality of linguistic elements 30. In the exemplary embodiment depicted in FIG. 1, some of the exemplary keys 28 have assigned thereto a first letter 34, a second letter 38, and a digit 42. It is noted that some of the keys 28 have only a single letter and/or include symbols such as punctuation marks for functions. The first and second letters 34 and 38 of the exemplary keypad 24 are arranged substantially in a QWERTY configuration, but other configurations are possible. It is also noted that the depicted keys 28 having multiple letters assigned thereto depict an example meant to accommodate the English language or other Latin language, and that other arrangements and assignments of various characters are possible to accommodate other languages.

As can be understood from FIG. 1, the movable portion 36 of the rollerball 32 is substantially continuously rotatable with respect to the housing 8 about a first axis 44 and about a second axis 48 to provide input. The movable portion 36 is depicted as being rotatable in a first direction 64 and in a second direction 68 about the first axis 44, and is rotatable in a first direction 72 and in a second direction 76 about the second axis 48. In the depicted example, the first direction 64 and the second direction 68 are opposite directions of rotation, and the first direction 72 and the second direction 76 similarly are opposite directions of rotation of the movable portion 36 with respect to the housing. It is reiterated, however, that the aforementioned directions with respect to the first axis 44 and the second axis 48 are exemplary only and that the movable portion 36 likely will be continuously rotatable about many other axes to provide input.

The movable portion 36 of the exemplary rollerball 32 may be additionally translatable along yet another axis (not shown) to provide an additional input in a manner not unlike that of a button, such as a selection input. The exemplary rollerball 32 may additionally provide some tactile feedback to the user such as clicks, pulses, or other indications that can be detected by the user. The rollerball 32 may be any of a variety of devices and, for example, can be a miniature rollerball offered by ITT Industries or other appropriate device. While it is stated herein that the movable portion 36 is substantially continuously rotatable about the first axis 44 and the second axis 48, it is understood that the movable portion 36 likely will be rotatable about substantially any axis extending through the movable portion 36 since the movable portion 36 is substantially spherical in shape and is supported in a fashion to generally provide free rotation while being retained on the base 40. As used herein, the expression "continuously rotatable" and variations thereof shall refer broadly to an item being freely rotatable while being retained on another item.

The output apparatus 16 includes a display 50. As will be explained in greater detail, screen objects representing applications and/or pieces of data are depicted on the display 50 at various times. As will also be explained, the user may select a screen object by employing a multi-axis input device to move a focus of a user interface program to that screen object, thereby making that screen object selectable, and then providing a selection input to effect selection of that screen object. The output apparatus 16 can additionally include, for instance, additional indicators such as lights, and the like, and can additionally include an audible output such as a speaker as well as other output devices.

The processor apparatus 20 includes a processor 210, an input interface 220 receiving input from a multi-axis input device such as the rollerball 32, a display interface 230 to drive the display 50, and a memory 250. The processor 210 accesses the memory 250 to retrieve and execute sequences of instructions making up software stored therein, such as a user interface program 252 and one or more of an application program 256. In executing a sequence of instructions of the user interface program 252, the processor 210 receives user inputs from a multi-axis input device such as the rollerball 32, and outputs various images to the display 50 in response to those inputs. It is understood that the memory 250 likely includes a number of other routines, and may optionally include a disambiguation routine to interpret user input received from keypad 24. The processor apparatus 20 may optionally further include a media storage device 240 capable of interacting with storage medium 241 (which may or may not be a form of removable media) to store and/or retrieve software and/or data, including the user interface program 252 and/or one or more of an application program 256.

In some embodiments, the user interface program 252 is an integral part of an operating system (not specifically shown) that is executed by the processor 210. In other embodiments, the user interface program 252 is provided as a resource to the operating system and/or other software of the handheld electronic device 4, and is employed by those pieces of software in carrying out various user interface operations. As will be readily recognized by those skilled in the software arts, it is common practice for user interface software to be provided as separate code that other software may be linked to or otherwise call to the routines of while being executed.

The user interface program 252 depicted as being stored within the memory 250 makes use of data also stored in the memory 250 which provides various settings, including the objects settings 254 which provide data on such characteristics of screen objects as their relative location on the display 50 and the identities of which applications and/or pieces of data they are associated with. As those skilled in the art will readily recognize, objects settings 254 may contain data specifying characteristics of one or more screen objects set by a vendor of the handheld electronic device 4, a user of the handheld electronic device 4, or still others involved in customizing or configuring various features of the handheld electronic device 4.

Figure 3:
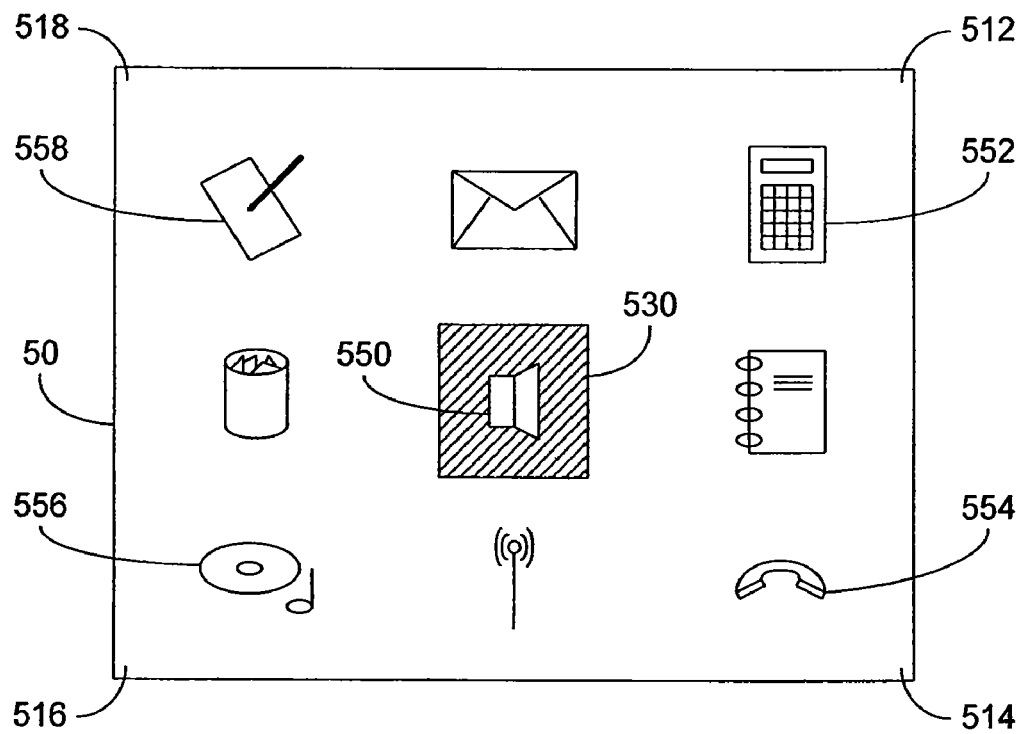
FIG. 3 and FIG. 4 are depictions of exemplary images on a screen of the handheld electronic device of FIG. 1.

The user interface program 252, when executed by the processor 210, provides a user interface to the handheld electronic device 4 that allows a user to rotate the movable portion 36 of the rollerball 32 (or operate some other form of multi-axis input device) to navigate through various menus and among various screen objects. Examples of visual output that may be provided by the user interface program 252 on the display 50 in accordance with the disclosed and claimed concept are depicted in FIG. 3 and in FIG. 4. In being executed by the processor 210, the user interface program 252 causes the processor to position screen objects 552, 554, 556 and 558 towards the upper right corner 512, the lower right corner 514, the lower left corner 516 and the upper left corner 518, respectively, of the display 50. As depicted in FIG. 3, the focus of the user interface software 252 is on a screen object 550 that is disposed inboard of the corners 512, 514, 516 and 518, and as depicted, is disposed generally towards the center of the display 50. The location of the focus may be visually indicated by the user interface software 252 with a highlight 530 applied to the screen object 550, or alternatively, with some other form of visual indicator, including but not limited to, an animation of or alteration to the screen object 550.

With the highlight 530 (and therefore, the focus of the user interface program 252) on the screen object 550 in FIG. 3, if a user were to provide a selection input (e.g., pressing an "enter" or "select" button, or effecting the earlier-described translation movement of the movable portion 36 of the rollerball 32), the application and/or piece of data associated with the screen object 550 would be selected. If the screen object 550 is associated with an application, then the selection of the screen object 550 may cause that application to be started. If the screen object 550 is associated with a piece of data, then the selection of the screen object 550 may cause that piece of data to accessed using whatever application may be associated with the data type of the piece of data.

To enable the blind selection of up to four particular applications and/or pieces of data, the screen objects associated with those four particular applications and/or pieces of data are positioned closest to the four corners 512, 514, 516 and 518 of the display 50, namely screen objects 552, 554, 556 and 558, respectively. The basis on which those four particular applications and/or pieces of data are selected may include any of a number of factors including, but not limited to, relative popularity of different applications, relative importance to typical users of different pieces of data, or selections made by the user of the handheld electronic device 4 through a customization routine.

The placement of a particular screen object towards a particular corner of the display 50 allows the focus of the user interface software 252 to be easily moved to that screen object by a user moving the movable portion 36 of the rollerball 32 (or other appropriate portion of whatever multi-axis input device is provided by the handheld electronic device 4) in a motion representative of moving towards that particular corner, i.e., into the quadrant that includes that particular corner. This movement of a portion of a multi-axis input device by a user does not have to be precisely in the direction of the particular screen object. The user interface program 252 does not permit the highlight 530 (and therefore, the focus of the user interface program 252) to be moved to a location beyond any edge of the display 50, including whichever two of the edges form the particular corner. Therefore, the positioning of the particular screen object towards the particular corner of the display 50 gives that object the benefit of a "capture" effect whereby even an imprecise movement of a portion of a multi-axis input device that causes the focus to move into the general area of a particular corner (e.g., the quadrant of the display 50 in which the particular screen object is positioned in the case of a rectangular display) will ultimately cause the focus to be guided into, and then caught and held within that particular corner. In this way, a user of the handheld electronic device 4 is able to select one of up to four screen objects (in the case of a rectangular display) without actually witnessing the movement of the highlight 530 towards the particular corner.

Figure 4:
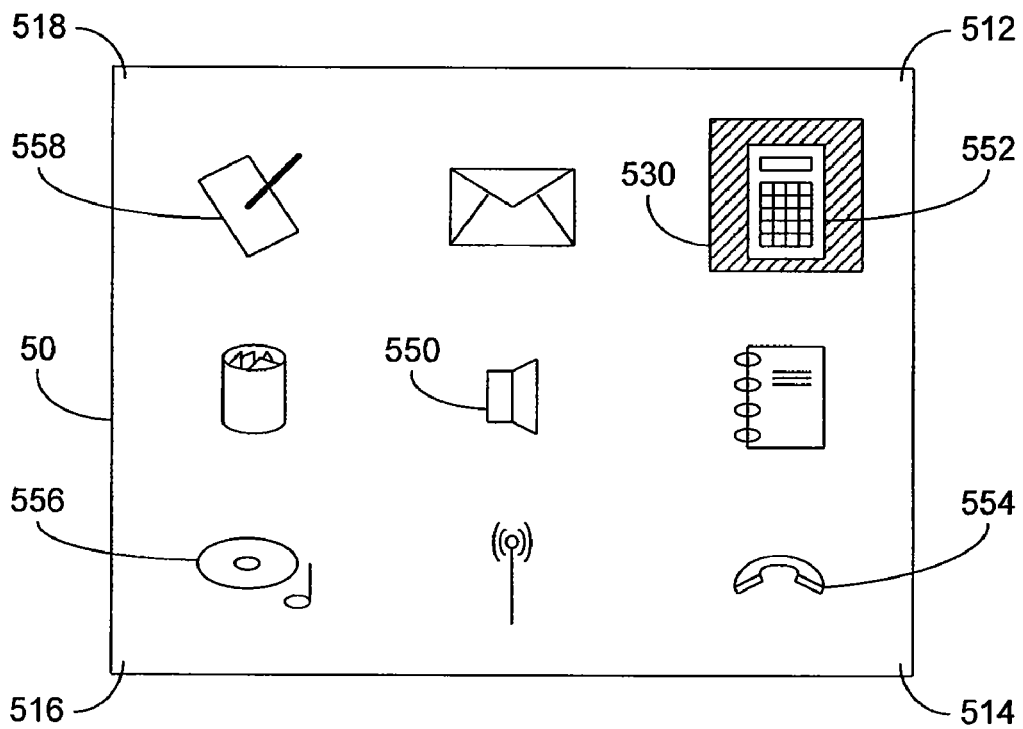

More precisely, FIG. 4 illustrates the result of moving the highlight 530 (and with it, the focus of the user interface program 252) from the generally central position depicted in FIG. 3 to the upper right corner 512 in FIG. 4. In using the rollerball 32 (or other multi-axis input device) to effect movement of the focus towards the upper right corner 512, the user need not be concerned with achieving movement in the exact direction of the screen object 552 from the center of the display 50, as long as the movement made by the user was at an angle heading into the upper right quadrant. This is because as the user continues the movement into the upper right quadrant, rightward movement would be limited by eventually reaching the right edge of the display 50 between the corners 512 and 514, and upward movement would be limited by eventually reaching the upper edge of the display 50 between the corners 518 and 512. Once the edge in either the rightward or upward direction is reached, further movement in that direction is restrained (i.e., resisted), while further movement in the other of these two directions is allowed to continue until the corresponding edge for that movement is also reached, with the result that the focus is guided such that the corner 512 is always reached with any movement that is made further into the upper right quadrant. This is the mechanism by which the "capture" effect is achieved, and this effect applies to each of the corners 512, 514, 516 and 518, and their corresponding quadrants of the display 50.

In this way, a user of the handheld electronic device 4 need only remember up to four applications and/or pieces of data for which a screen object is positioned in one of the four corners 512, 514, 516 and 518 of the display 50, and then, that user is able to operate the handheld electronic device 4 may employ the "capture" feature to move the focus of the user interface program 252 to that object and then select it without viewing the display 50. Although various pictorial screen objects are shown on the display 50 in FIG. 3 and FIG. 4, and the screen objects shown have an appearance that is suggestive of particular applications and/or pieces of data, it will be understood by those skilled in the art that the screen objects selected for placement in one or more of the corners 512, 514, 516 and 518 may be of any chosen appearance, and may correspond to any application and/or piece of data.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof. Furthermore, the use of such terms as upper, lower, left and right should not be construed as being restrictive as to orientation.

What is claimed is:

1. A handheld electronic device comprising:
a processor apparatus comprising a processor and a memory;
an input apparatus cooperable with the processor apparatus;
an output apparatus cooperable with the processor apparatus, the output apparatus including a display; and
a housing;
the processor apparatus being adapted to receive input from the input apparatus and to provide output to the display to present a plurality of screen objects, wherein a first screen object of the plurality of screen objects is positioned towards a corner of the display formed by two edges of the display;
the input apparatus including a multi-axis input device; and
the memory having stored therein a routine that is executable on the processor, wherein the routine is responsive to inputs from the multi-axis input device to move a focus of the routine toward the corner, and wherein the routine creates a capture effect for the corner of the display which, in response to an input from the multi-axis input device which moves the focus towards and potentially beyond a quadrant that includes the corner, resists movement of the focus by the user beyond either of the two edges defining the corner and moves the focus to the first screen object.

2. The handheld electronic device of claim 1 wherein the multi-axis input device is comprised of a movable portion that is translatable with respect to the housing to provide an input.

3. The handheld electronic device of claim 2 wherein the movable portion is substantially spherical.

4. The handheld electronic device of claim 2 wherein the input is a selection input to select an object to which the focus has been moved.

5. The handheld electronic device of claim 1 wherein the routine provides a visual indication of the focus having been moved to the first screen object.

6. The handheld electronic device of claim 5 wherein the visual indication is a highlight applied to the first screen object.

7. The handheld electronic device of claim 1 wherein the first screen object corresponds to an application, and wherein a movement of the focus to the first screen object and a selection input with respect to the first screen object causes the application to be executed by the processor.

8. The handheld electronic device of claim 1 wherein the first screen object corresponds to a piece of data, and wherein a movement of the focus to the first screen object and a selection input with respect to the first screen object causes the piece of data to be accessed with an application corresponding to the data type of the piece of data.

9. A method of enabling selection of a first screen object presented on a display of a handheld electronic device, the handheld electronic device including a housing, a processor apparatus, an input apparatus, and an output apparatus, the input apparatus including a multi-axis input device, the processor apparatus including a processor and a memory, the processor structured to execute a user interface program, said user interface program having a focus, the memory including a routine stored therein, the output apparatus including the display, the method comprising:

presenting a first screen object on the display at a position towards a corner formed by a first edge of the display and a second edge of the display;

detecting an input from the multi-axis input device;

responsive to said input to move said focus of the user interface program from a position on said display towards said corner, guiding movement of the focus to the first screen object by resisting movement of the focus beyond the first edge and the second edge; and awaiting a selection input to select the first screen object.

10. The method of claim 9, further comprising detecting a selection input from the multi-axis input device and selecting the first screen object in response to the selection input.

11. The method of claim 9, further comprising associating the first screen object with an application to enable the application to be executed by the processor in response to the first screen object being selected.

12. The method of claim 9, further comprising associating the first screen object with a piece of data to enable the piece of data to be accessed with an application associated with the data type of the piece of data in response to the first screen object being selected.

* * * * *